US011064690B2

(12) United States Patent
Pérez Salvador et al.

(10) Patent No.: US 11,064,690 B2
(45) Date of Patent: Jul. 20, 2021

(54) SPRAYER

(71) Applicant: PULVERIZADORES FEDE, S.L., Valencia (ES)

(72) Inventors: Federico Pérez Salvador, Valencia (ES); Lars Torsten Berger, Valencia (ES)

(73) Assignee: Pulverizadores Fede, S.L., Valencia (ES)

(*) Notice: Subject to any disclaimer, the term of this patent is extended or adjusted under 35 U.S.C. 154(b) by 0 days.

(21) Appl. No.: 15/543,523

(22) PCT Filed: Nov. 25, 2016

(86) PCT No.: PCT/ES2016/070840
§ 371 (c)(1),
(2) Date: Jul. 13, 2017

(87) PCT Pub. No.: WO2017/093583
PCT Pub. Date: Jun. 8, 2017

(65) Prior Publication Data

US 2018/0000061 A1 Jan. 4, 2018

(30) Foreign Application Priority Data

Dec. 2, 2015 (ES) .................................. 201531754

(51) Int. Cl.
*A01M 7/00* (2006.01)
*B05B 3/02* (2006.01)

(52) U.S. Cl.
CPC ........ *A01M 7/0089* (2013.01); *A01M 7/0003* (2013.01); *A01M 7/0014* (2013.01); *B05B 3/022* (2013.01)

(58) Field of Classification Search
CPC .... A01M 7/0089; A01M 7/005; A01M 7/006; A01M 7/0014; A01M 7/0003;
(Continued)

(56) References Cited

U.S. PATENT DOCUMENTS 4,657,476 A * 4/1987 Berg ..................... F01D 17/165 415/164
4,991,341 A * 2/1991 Douglas .............. A01M 7/0014 47/1.7

(Continued)

FOREIGN PATENT DOCUMENTS

DE 4331825 11/1994
DE 19600660 7/1997

(Continued)

OTHER PUBLICATIONS

International Search Report issued in connection with PCT/ES2016/070840 dated Dec. 1, 2017; 2 pgs.

*Primary Examiner* — Qingzhang Zhou
*Assistant Examiner* — Christopher R Dandridge
(74) *Attorney, Agent, or Firm* — Vedder Price, P.C.

(57) ABSTRACT

The invention relates to a sprayer of the type comprising a turbine that generates an air current, a nozzle that channels the air current and an outlet of this current to the outside, carrying with it the product dosed by a series of nozzles arranged in the area of influence of the air current, the sprayer being special in that both the air outlet opening and the turbine can be configured and act in a coordinated manner to obtain the desired air flow for each type of crop and spray application, where the optimum air flow for each spray application and the configuration of the turbine and opening are determined by the actual sprayer by means of a processor and auxiliary means.

17 Claims, 2 Drawing Sheets

(58) Field of Classification Search
CPC .. A01M 7/001; A01M 7/0039; A01M 7/0042; A01M 7/0092; A01M 7/0096; B05B 3/022; B05B 3/02; B05B 3/021
See application file for complete search history.

(56) References Cited

U.S. PATENT DOCUMENTS

| | | | | | |
|---|---|---|---|---|---|
| 5,098,018 | A | | 3/1992 | Hadar et al. | |
| 5,373,990 | A | * | 12/1994 | Ballu | A01M 7/0014 239/77 |
| 9,341,242 | B2 | * | 5/2016 | Gotz | B60K 6/387 |
| 2012/0085836 | A1 | * | 4/2012 | Tiu | B05B 13/0278 239/77 |
| 2012/0325929 | A1 | * | 12/2012 | Landers | A01M 7/0014 239/78 |
| 2013/0084179 | A1 | * | 4/2013 | Mantese | F01D 17/162 416/1 |
| 2013/0184121 | A1 | * | 7/2013 | Bertazzoli | F16H 29/04 476/50 |

FOREIGN PATENT DOCUMENTS

| | | | | |
|---|---|---|---|---|
| EP | 0479656 | | 4/1992 | |
| ES | 1007072 | | 1/1989 | |
| ES | 2047997 | | 3/1994 | |
| ES | 1054847 | * | 1/2003 | B05B 15/10 |
| ES | 1054847 | | 9/2003 | |
| ES | 2356490 | | 4/2011 | |
| GB | 2214047 | | 8/1989 | |

* cited by examiner

SPRAYER

CROSS-REFERENCE TO RELATED APPLICATIONS

This application is a national stage application that claims the benefit of and priority from International Application No. PCT/ES2016/07084, filed Nov. 25, 2016, which claims the benefit of and priority from Spanish Application No. P201531754, filed Dec. 2, 2105, both of which are wholly incorporated herein by reference.

As indicated by its title, the present invention relates to a sprayer of the type comprising an air current generator, preferably of the turbine type, installed in a nozzle such that the air current generated by the turbine is directed inside said nozzle, normally to a deflector that leads to an opening through which the air current reaches the outside, incorporating in same the plant-health product dosed by a number of spray-nozzles arranged in the area of influence of the air current such that the product is transported by the exiting air current to the crop, characterised in that it determines the optimum outlet air current for each spray operation in view of parameters such as crop characteristics, weather factors or type of treatment among others, and configuring in a coordinated manner the turbine and the opening to obtain the appropriate outlet air current and an optimum performance of the spray unit with significant energy savings.

The field of the art of the invention is that of agricultural machinery.

BACKGROUND OF THE INVENTION

Sprayers have been known for some time of the type comprising a turbine installed in a nozzle having an opening through which the air current reaches the exterior, carrying with it the product to be sprayed dosed by spray-nozzles provided in the area of influence of the air current.

Normally, the spray-nozzles are located in the path of the air current so that the product dosed by them is carried away directly by the air current; however, in some devices the spray-nozzles are moved away from the air current but project the product so as to incorporate it into said air current.

The statement that the spray-nozzles are in the area of influence of the air current means both that the spray-nozzles in the path of the air current are such that the product is incorporated into the air current as soon as it flows past the nozzle, and that the spray-nozzles that are moved away from the air current can project the product such that it is incorporated into the air current.

In this way, the air current transports the product, normally a plant-health product, to the crop where it must be applied.

In these sprayers it was common, at most, to regulate the air current for each crop type, so that the air flow and product scattering was constant throughout the spraying time, any variations being due to the air generator engaging with the engine of the tractor vehicle, changing the rotation speed by increasing or decreasing the revolutions of the engine to change the outlet air flow in an uncontrolled manner.

It is obvious that product was wasted, as on the one hand the spraying continued even in intermediate areas without plants, and on the other hand the lack of control of the outgoing air flow led to either excessive force generating undesired drift or insufficient force leading to deficient application of the product, which in turn resulted in loss of part of the crop or the need for a new treatment application.

To overcome the aforementioned drawback, spraying control systems have been developed. Some of these detect the presence or absence of plant mass, stopping spraying in absence of plants.

British patent GB2214047 relates to a sprayer comprising a presence detector, so that in the absence of plant mass there is no spraying, and also includes means for adjusting the amount of product dosed according to the speed of the tractor vehicle so to achieve even spraying; this patent does not describe means for controlling the air current that are independent from the engine of the tractor vehicle.

Spanish patent ES2047997 describes a device of the type discussed above, which makes it possible to guarantee an air stream with constant power regardless of the fan driving means. For this purpose it comprises an air flow meter and means for changing the air flow at its source. As options it considers including fins in the fan suction area, means for changing the suction cross-section or means for changing the fan pitch. However, this patent does not described combined means.

Patent literature also exists relating to sprayers with a greater degree of automation as well as systems for lifting the spray tubes, as in U.S. Pat. No. 5,098,018, which discloses a system for adjusting the fan vanes and conical cavities for keeping the spray air flow constant along the entire length of the spray arm.

There are many patents relating to systems for adjusting the position of the vanes of a fan, most of which belong to the field of aviation and engines. Examples include old documents such as DE19600660, DE4331825 or more recent ones such as ES52356490, JP2006057627 or JPS5888498.

The same applicant holds a previous record, Spanish Utility Model U200301196, relating to a sprayer of the type comprising a turbine inside a nozzle that directs the generated air flow towards dispensing tips arranged in the air flow outlet channel, with the feature that the nozzle has a straight movement towards or away from the tips in order to narrow or widen the air flow channel and change the outgoing air flow. This record does not discuss the combination of other elements for changing the air outlet speed.

Tests conducted show that for every air flow intended to reach the outside carrying the product, there is an optimum coordinated configuration of the turbine and the opening.

Turbine configuration is understood as the adaptation thereof to obtain a specific air flow, and opening configuration is understood as the size of the opening for adjusting the amount of air that reaches the outside per unit of time.

The behaviour of the air flow reaching the outside is not gradual or proportional, nor does it follow a simple arithmetical pattern. In fact, a larger opening, for a given air flow generated by the turbine, does not always involve a proportionally larger exit flow, nor does changing the air flow generated by the turbine, for a given opening size, result in a proportional increase or decrease in the exit flow.

There are numerous factors affecting the exit air flow, and only a coordinated control of the air flow generated by the turbine and the opening size allows the correct air flow to be obtained in the most efficient manner.

None of the sprayers hitherto known, some of which incorporate some of of the cited patents, achieve the level of energy and product optimisation provided by the subject matter of the proposed invention.

DESCRIPTION OF THE INVENTION

The proposed invention relates to a device that can efficiently and accurately supply the air flow needed for each spraying operation.

The device comprises:

1. At least one turbine configurable for regulating the outgoing air flow.
2. A nozzle with at least one configurable opening that acts in coordination with the turbine.
3. Means for changing the turbine configuration.
4. Means for changing the configuration of the nozzle opening.
5. Means for knowing the configuration of the turbine and the opening.
6. Means for calculating the optimum configuration of the turbine and opening for each spraying operation.
7. Means for adjusting the sprayer according to the specific configuration, coordinating the configuration of the turbine and the opening.

1.—the Configurable Turbine for Adjusting the Outgoing Air Flow.

The term configurable means that some of its features may be modified in order to change the air flow.

The features constituting variable elements are the turbine rotation speed and the angle of attack of the vanes; one or both of these may be changed.

a) Turbine with Variable Rotation Speed:

If a turbine is used in which the outgoing air flow is adjusted by controlling the rotation speed, the turbine must include elements that allow the rotation speed to be changed. An example of these is a gearbox associated with the turbine, or for turbines with electric motors, a current or resistance variator, such as a potentiometer.

To invert the air current such that the air generated by the turbine reaches the outside through the protective grid, thereby removing leaves and other plant remains, it is necessary to invert the turbine rotation. Thus, the gearbox must comprise an inversion gear for the turbine rotation and the current variator must comprise a current inverter that inverts the rotation of the motor, assuming the motor is an electric motor that allows this.

b) Turbine with Adjustable Vanes.

The adjustable vanes are designed to change the airflow without changing the speed of rotation of the turbine, thereby eliminating the need to incorporate mechanical means with higher costs in order to change the rotation speed. However, there is no technical limitation for a single turbine to include both an element for changing the rotation speed, as discussed above, and adjustable vanes.

The vanes have a rotational motion about a longitudinal shaft, so that the transverse axis of each vane can change its position from a positive angle to a negative angle, defining the neutral point or 0° as the position in which the transverse axis of the vane is perpendicular to the turbine shaft.

The rotation angle shall be from +89° to −89°, preferably from +50° to −50°, and more preferably from +45 to −45°.

The possibility that the vanes can change their position from a positive to a negative angle and vice versa allows the air current to be inverted without having to invert the rotation of the turbine.

If the air current is inverted, the nozzle becomes a suction channel—in this case a secondary suction channel.

Inverting the air current is particularly useful, for example, for removing leaves and other plant remains from the grating of the primary suction channel.

There are various systems for changing the angle of attack of turbine vanes. It is common for the vanes to have two shafts, one about which rotation occurs, which we will refer to as the rotation shaft, and an eccentric one which causes the rotation when it moves.

The movement of the eccentric shaft is produced by the means for changing the position of the vanes.

2.—The Configurable Opening that Acts Jointly with the Turbine Configuration.

Sprayers are common nowadays that disperse product through spray-nozzles mounted on a panel or vertical parallel panels, these spray-nozzles arranged around a turbine that generates an air flow which, channelled, carries the product from the spray-nozzles and drives it to the trees and plants to be treated.

Said turbines are in a nozzle formed by a hollow, normally cylindrical body.

The nozzle is the element through which the air current generated by the turbine moves during the spraying operations, whereas, according to the present invention, when the angle of attack of the vanes is inverted, the nozzle becomes the suction channel for the turbine.

To differentiate the normal suction channel and the suction channel when the vane angle is inverted, the suction channel in normal spraying operations will be referred to as the main suction channel, and the suction channel during grating-cleaning operations, when the vanes are in a negative angle and the air current is inverted, will be referred to as the secondary channel.

For the spraying operation the air current generated by the turbine and moving through the nozzle must reach the outside carrying in its passage the product added by the spray-nozzles present in the area of influence of the air current.

The air reaches the outside through one or more openings, at least one of which is adjustable.

An opening is considered as the open space through which the air reaches the outside Normally this will be the same as the separation between the nozzle and the panel bearing the spray-nozzles, unless the spray-nozzles are mounted on a different structure.

This opening can be adjusted to allow changing the outgoing air flow and its speed and carrying pressure for the plant-health product, thereby controlling the penetration of the stream or cone of fluid sprayed onto the tree or plant according to the operational needs of the user, leading to an improved use of the plant-health product that reaches the inside of the trees and reducing the consumption of said product as less fluid is spilled or wasted around the trees.

To change the size of the opening it is necessary to either move the nozzle, move the spray-nozzle panel or move both. All of these options allow the opening size to be changed. However, for structural reasons that will be explained below, it has been decided to move the nozzle.

3.—Means for Changing the Turbine Configuration.

In a turbine with variable rotation speed, the means for changing the configuration of the turbine comprise a gearbox or, in the case of a turbine driven by an electric motor, a power variator such as a potentiometer.

In a turbine with adjustable vanes, which can have variable or constant rotation speed, the turbine comprises a precision actuator referred to as the turbine actuator. This precision actuator, which is preferably electric, acts on the eccentric shafts of the vanes, making them move.

For this purpose, the end of the eccentric shafts of each vane is housed in a channel that extends along the side of a drum, referred to as the circular peripheral channel.

This drum is on the rotation shaft of the turbine inside the bearing on which the vanes turn, and preferably moves with the rotation shaft of the turbine.

The to-and-fro motion of the drum, pushed or pulled by the turbine actuator, moves the eccentric shafts of each vane, making them rotate about their rotation shafts.

The aforementioned actuator exerts a force on the drum, pushing or pulling it via a precise, preferably direct, transmission.

4.—Means for Changing the Opening Configuration

To change the configuration of the opening it is necessary to either move the nozzle, move the spray-nozzle panel or move both. All of these options allow the opening configuration to be changed. However, for structural reasons it has been decided to move the nozzle.

For this purpose, the nozzle is able to move to-and-fro on a straight line, towards or away from the spray nozzles, by the action of push means preferably provided in an area of the front of the nozzle.

To aid the displacement along a straight line, guides are provided which are preferably located around the nozzle.

In addition, the invention is characterised in that the means for pushing the nozzle comprise at least a millimeter-displacement piston referred to as the nozzle actuator, controlled by an integrated circuit with a controller.

Said nozzle actuator is connected to the nozzle by a transmission referred to as the nozzle transmission The nozzle actuator, during its controlled movement, can move the nozzle along the guides towards the spray nozzles, while retracting the nozzle actuator separates the nozzle from said spray nozzles.

The dimensions of said opening will change the air flow that reaches the outside.

5.—Means for Knowing the Configuration of the Turbine and the Opening: Information from the Gearbox, the Current Variator, Calculation of the Position from a Known Position or Vane Position Sensors and Opening Position Sensors.

In a turbine with a gearbox, the actual gearbox provides information on the turbine configuration.

In a turbine driven by an electric motor, where the speed is variable using a current variator such as a potentiometer, said variator provides the information on the turbine configuration.

In a turbine where the vanes can be adjusted, it is necessary to know the position of the vanes in order to determine the movement needed to obtain the specified configuration for the specific spraying operations.

The position of the vanes can be calculated from the last known position and the movement exerted by the turbine actuator, determining the current position of the vanes.

An alternative solution is the use of sensors.

The introduction of sensors in the turbine to be placed on the vanes may lead to problems, firstly due to the difficulty of connecting sensors placed on a revolving element, and secondly due to the risk of loss of calibration as they are constantly subjected to centrifugal forces.

To prevent said problems, the sensors have been placed in an external area away from the vanes. To differentiate them from other sensors, these are referred to as the vane sensors.

The vane sensors are located in the turbine actuator or in the turbine transmission, but preferably in the turbine actuator to make use of the ducts for the connections that need to lead to said actuator.

Thus, since the turbine transmission is accurate, the data obtained in the actuator regarding its position make it possible to determine the position of the vanes.

As in the case of the means for knowing the turbine configuration, it is necessary to know the opening configuration in order to perform the variations needed to adapt it to the desired situation.

As with the vanes, the configuration of the opening could be calculated based on the last known configuration and in view of the movement of the opening actuator. It is also possible as an alternative to use sensors, referred to as opening sensors.

The use of sensors in the actual opening may not be advisable due to the risk of calibration loss, as it is constantly subjected to strong air currents and constant humidity.

To solve the aforementioned problems the opening sensors are placed in an area separated from the opening and the air currents, preferably on the piston of the nozzle actuator.

A direct, accurate transmission system without play makes it possible to determine, with a low margin of error, the position of the opening according to the data of the actuator piston.

6.—Means for Calculating the Optimum Configuration of the Turbine and the Opening for Each Spraying Operation.

As described, the combined use of turbine configuration and opening configuration make it possible to obtain an optimum configuration of the sprayer for each air flow required.

The first matter involves determining the optimum airflow for each spraying operation, which is performed automatically according to parameters such as crop type, treatment type, pruning type, plant volume per unit area, treatment dose, weather conditions, vehicle speed or spray-nozzle discharge among others.

These parameters can be entered manually in each case, but they can also be completely or partially memorised from previous processes or databases.

Some parameters can also be obtained from outside sources, such as weather data, or via sensors installed in the actual spraying equipment, including the accessories and complements such as the tractor head and trailer, among others.

A processor calculates the air flow needed according to the parameters to be considered for each specific spraying operation.

After obtaining the data on the necessary air flow the sprayer can calculate the optimum configuration or search a stored library for the optimum turbine and opening configurations for each air flow.

Thus, the means for determining the optimum configuration of the sprayer comprise:

1. Means for entering data into the system. The entry can be:
   a. Manual data entry.
   b. Recovery of data previously entered in a memory.
   c. Obtaining data from external sources.
   d. Obtaining data from sensors located in the actual sprayer.
2. Memory for storing data.
3. Processor for:
   a. Determining the air flow either by calculation or by consulting pre-stored libraries of air flows for each spraying operation.
   b. Determining the optimum configuration of the turbine and opening, by calculation or by consulting a library of optimum configurations for each air flow required.

7.—Means for Coordinating the Turbine Configuration and the Configuration of the Opening to Obtain the Optimum Configuration of the Sprayer.

After defining the configuration of the turbine and the opening, the sprayer comprises means for executing this configuration, placing the turbine and the opening in the correct configuration.

The means for coordinating the movements and positions of the vanes and opening comprise:

Connections to the turbine gearbox or electrical power variator or to the sensors of the vanes, so as to know the turbine configuration at that time, referred to as the initial turbine configuration. This initial configuration can also be obtained by a calculation based on the last known position.

Connections to the opening sensors to know the opening configuration at the time, referred to as the initial opening configuration. This initial configuration can also be obtained by a calculation based on the last known position.

A processor for calculating, as applicable, the initial positions as described above and the actions needed to pass in each case from the initial configurations to the optimum configuration.

Connections to the gearbox, power variators or the actuators for activation, taking the sprayer to its optimum configuration.

Connections refers both to wired connections and wireless connections, including those currently known, such as Wi-Fi, Bluetooth or radio, as well as any that may be developed in the future.

As an example of the results obtained by the coordinated action of angling vanes and opening size, the following table is provided:

| ANGLE (°) | SIZE CHANNEL A (mm) | Avg speed (m/s) | QTOTAL (m3/h) | POWER (CV) |
|---|---|---|---|---|
| 20° | 110 | 24.947 | 55700.098 | 23.460 |
| 20° | 130 | 23.304 | 56058.466 | 23.588 |
| 20° | 150 | 21.787 | 56390.834 | 22.754 |
| 25° | 110 | 30.449 | 68367.334 | 28.150 |
| 25° | 130 | 28.539 | 68960.525 | 28.060 |
| 25° | 150 | 27.304 | 71259.400 | 29.623 |
| 30° | 110 | 35.319 | 79016.411 | 37.703 |
| 30° | 130 | 33.755 | 81867.786 | 38.335 |
| 30° | 150 | 32.786 | 85329.261 | 37.050 |
| 35° | 110 | 37.838 | 84753.357 | 42.983 |
| 35° | 130 | 36.491 | 87779.910 | 43.726 |
| 35° | 150 | 35.150 | 91071.978 | 44.520 |

This provides data from tests conducted for vane angles of 20°, 25°, 30° and 35° and opening sizes of 110, 130 and 150 mm in each case.

For example, for a vane angle of 30° and an opening size of 150 mm, the flow increase is considerable and the power required is reduced.

DESCRIPTION OF AN EMBODIMENT OF THE INVENTION

Figure 1:
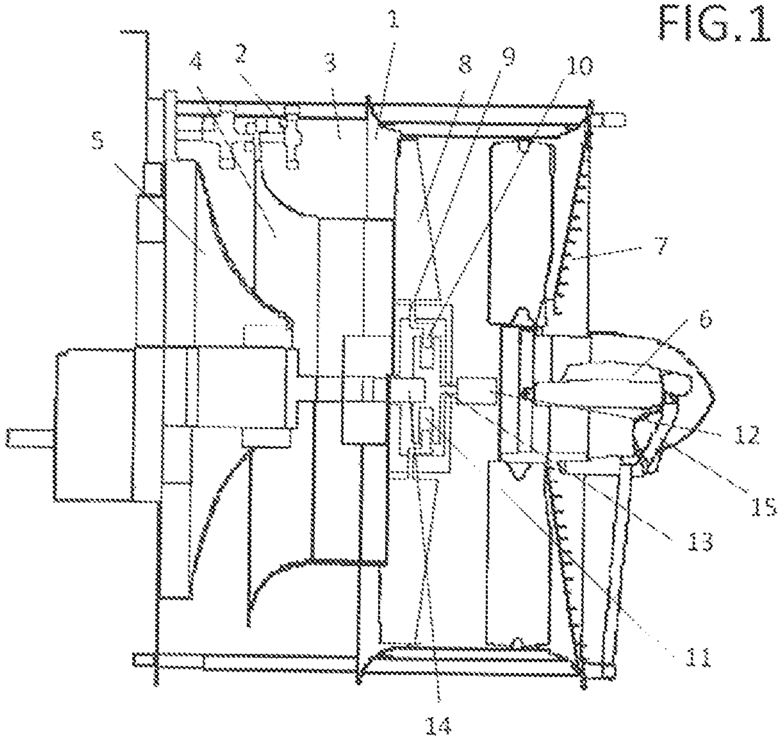
FIG. 1 shows a cross-section of a possible embodiment where the variation in the airflow generated by the turbine is obtained by changing the vane angle, showing the main elements of the device such as the nozzle (1), spray nozzles (2), opening (3), deflectors (4) and (5), nozzle actuator (6), nozzle transmission (15), main suction channel grid (7), vanes (8), rotation shaft (9) of the vanes, eccentric shaft (10) of the vanes, peripheral circular channel (11) housing the end of the eccentric shaft of the vanes, turbine actuator (12), turbine transmission (13) and turbine shaft (14).
Figure 2:
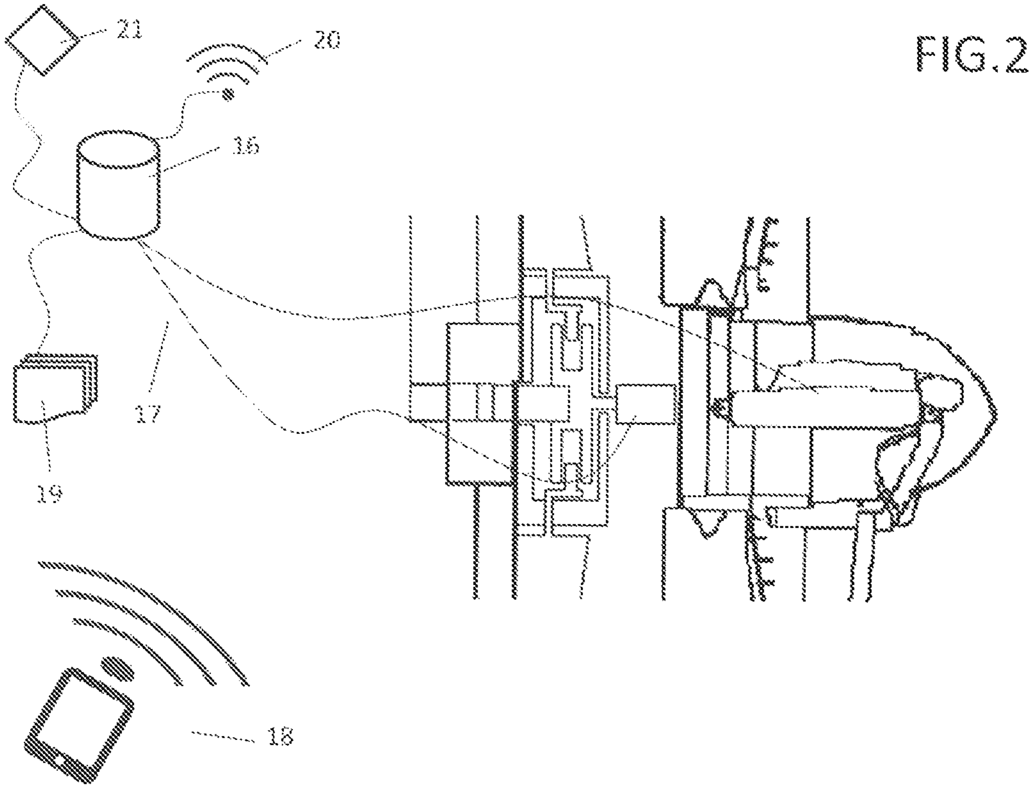
FIG. 2 shows a schematic representation with the microprocessor (16), the connections to the actuators (17), the interface (18) for entering data, the memory (19), connections for obtaining data from external sources (20), sensors (21) arranged on the actual sprayer.

An embodiment of the invention is described by way of example and in a non-limiting sense, that the scope of protection shall extend to embodiments other than that described that share the technical solutions claimed herein.

The device that is the subject matter of the invention is meant to optimise spraying operations by adjusting the airflow required in order to avoid product drifting or insufficient product penetration, configuring the sprayer such that each air flow required is obtained in an optimum manner with the resulting savings in energy.

The sprayer used to explain an embodiment of the invention is of the type comprising at least one turbine, a nozzle, at least one deflector directing the air current to an outlet opening, and a series of spray-nozzles for dispensing the product arranged in the area of influence of the outgoing air flow.

In the proposed sprayer, the determination of the necessary air flow is obtained using a processor and considering a number of parameters, and the air flow regulation is carried out by a combination of two elements of the sprayer, in this case the turbine configuration by controlling the position of the turbine vanes and the opening configuration which, acting jointly, provide accurate of the outlet air flow that disperses the product to be sprayed, and optimise energy use.

However, the variation in the outlet air flow is not directly proportional to the variation in the opening size or the variation in the vane position, nor does it follow an arithmetic or geometric progression. Instead, for each required air flow, a specific configuration of the turbine and opening is needed in order for the sprayer to perform optimally.

The intended device comprises:

1.—Means for determining the correct air flow, which in turn comprise:

- a) An information entry system, comprising:
  - a. An interface (18) for manually entering data on the type of crop, treatment, pruning, plant volume per unit area, treatment dose, weather conditions, vehicle speed or spray-nozzle discharge among others.
  - b. Means for retrieving parameters stored in the memory (19).
  - c. Means for obtaining parameters from external sources (20), such as weather data.
  - d. Sensors (21) arranged in the actual sprayer.
- b) Memory (19) for storing data.
- c) A processor (16) for running the air flow calculation processes, although in an alternative embodiment the air flow can be determined by consulting a data library.
- d) Means for retrieving, from the memory (19), data on optimum sprayer configurations for each air flow, although in an alternative embodiment the optimum configuration can be obtained via mathematical calculations.

2.—Turbine with adjustable vanes.

3.—Adjustable opening (3).

4.—Means for adapting the configuration of the sprayer to the configuration considered to be optimum, which comprise:

Means for changing the position of the vanes, which in turn comprise:

- a. Turbine actuator (12).
- b. Peripheral circular channel (11).

c. Vane eccentric shaft (10)

d. Turbine transmission (13)

Means for changing the size of the openings, which in turn comprise:

e. Nozzle actuator (6)

f. Nozzle transmission (15)

6.—Means for determining the position of the vanes, comprising position sensors placed on the turbine actuator (12) which are referred to as vane sensors, although in an alternative embodiment it is possible to determine the position of the vanes by a combination of data on their last known position and on the movement of the turbine actuator.

7.—Means for determining the size of the opening, comprising sensors placed on the nozzle actuator (6) which are referred to as opening sensors, although in an alternative embodiment it is possible to determine the size of the opening by a combination of data on their last known position and on the movement of the nozzle actuator.

8.—Means for coordinating the movement of the vanes and the nozzle in order to change the opening size, which comprise:

a) A processor (16) for calculating the movement needed to take the vanes and the opening to the optimum configuration based on their initial positions.

b) Connections to the actuators (17).

The device comprising the specified elements behaves as follows:

The interface (18) can be a tablet device or smartphone that allows data to be entered, as well as displaying data on the sprayer or the spraying process.

The processor (16) is preferably located on the sprayer, in a protected area.

Also on the sprayer, in a protected area, are the memory (19) for storing information, the means for retrieving from the memory data on the optimum configurations of the device for each air flow, and the means for coordinating the movement of the vanes.

This is not the only option as it is technologically possible to connect several elements so that, for example, the data are stored in the cloud or in a device external to the sprayer, and the microprocessor can be located elsewhere and be connected to the remaining elements.

The interface and the other means for entering information are used to enter the parameters required to calculate the air flow necessary for the specific spraying operation to be performed.

After the processor (16) determines the required air flow, either by consulting a data library or by calculation with the appropriate formulas, the optimum sprayer configuration is calculated, i.e. the position of the vanes (8) which, in combination with the size of the opening (3), provides the desired air flow with the lowest consumption level.

This is done by comparing the values of the required air flow to a configuration library until finding the one that corresponds to the required air flow.

Alternatively, this could also be calculated, although it is considered safer to use data from previously confirmed tests.

After determining the optimum configuration of the sprayer, it is necessary to adapt the sprayer to this configuration, for which the necessary movements are calculated based on the initial configurations of the vanes and nozzle.

The initial positions of the vane and opening are known from the nozzle and turbine sensors, or can be calculated based on the last known position and the movements performed subsequently by the corresponding actuators.

If sensors are used, they will not be placed on the vanes or the nozzle, but instead on the corresponding actuators in order to ensure the correct and lasting calibration thereof.

After calculating the movements to be performed, the means for coordinating the movement of the vanes and nozzle that control the turbine and nozzle actuators will activate them until each reaches the predetermined optimum position.

At any time during the spraying operation, the user can invert the air current to clean leaves and plant remains from the grating of the suction channel.

The air current can be inverted without having to invert the rotation of the turbine, simply by changing the angle of attack of the vanes, which is a considerable advantage.

The invention claimed is:

1. A sprayer comprising:

a turbine for generating a volume of air currents within the sprayer, a turbine actuator connected to the turbine that adjusts the volume of the air currents, a nozzle disposed about the turbine through which said volume of the air currents is discharged from an outlet of the nozzle, wherein the nozzle is movable along a longitudinal axis of the sprayer;

a deflector disposed adjacent the outlet of the nozzle so that the volume of the air currents are channeled to an opening defined in part by the nozzle and having an area that discharges the volume of the air currents from the sprayer at a speed;

a nozzle actuator connected to the nozzle to adjust a longitudinal position of the nozzle toward and away with respect to the deflector so as to adjust the area of the opening and the speed of the air currents;

a spray nozzle disposed adjacent the opening in operational communication with the air currents and configured to discharge a product into the air currents during a spraying operation; and an information entry system comprising an interface for data entry;

a memory with stored data applicable to the spraying operation;

a sensor disposed on the sprayer; and a connection for obtaining data from outside sources;

a processor configured for determining a continuously adjustable coordinated configuration of the turbine and the area of the opening during the spraying operation including the volume and speed of the air currents to be discharged during the spraying operation.

2. The sprayer according to claim 1, wherein the turbine actuator comprises a gearbox coupled to the turbine.

3. The sprayer according to claim 1, wherein the turbine actuator comprises an electric motor coupled to a current variator that is connected to the turbine.

4. The SPRAYER according to claim 1, wherein the turbine actuator comprises adjustable vanes with an adjustable angle such that, taking as 0° the position in which the transverse axis of the vane is perpendicular to a rotation shaft of the turbine, and a turning angle of the vanes ranges from +89° to −89°, wherein, when the turbine is rotated in a single direction, the air currents are discharged into the nozzle and opening when the turning angle of the vanes is greater than 0° and the air currents are discharged into a suction channel grid when the turning angle of the vanes is less than 0°.

5. The sprayer according to claim 4, wherein a drum with a peripheral circular channel includes, disposed therein, eccentric shafts of the vanes, in which the turbine actuator and said drum are connected in order to adjust an angle of attack of the vanes.

6. The sprayer according to claim 1, wherein the processor for determining the configuration during the spraying operation comprises the memory and a library of predetermined airflows and predetermined coordinated configurations for each of the predetermined volume and speed of the air currents.

7. The sprayer according to claim 4, wherein the sensor includes a vane position sensor.

8. The sprayer according to claim 7, wherein the vane position sensor is disposed in the turbine actuator.

9. The sprayer according to claim 1, wherein the sensor is a nozzle position sensor.

10. The sprayer according to claim 9, wherein the nozzle position sensor is disposed in the nozzle actuator.

11. The sprayer according to claim 2, wherein the gearbox comprises a gear for inverting the rotation of the turbine.

12. The sprayer according to claim 3, wherein the current variator comprises an inverter of the rotation of the motor.

13. The sprayer according to claim 1, wherein the turbine includes vanes with an adjustable angle of attack such that, taking as 0° the position in which a transverse axis of the vane is perpendicular to a rotation shaft of the turbine, and a turning angle of the vanes ranges from +50° to −50°, wherein, when the turbine is rotated in a single direction, the air currents are discharged into the nozzle and opening when the turning angle of the vanes is greater than 0° and the air currents are discharged into a suction channel grid when the turning angle of the vanes is less than 0°.

14. The sprayer according to claim 1, wherein the turbine includes vanes with an adjustable angle of attack such that, taking as 0° the position in which a transverse axis of the vane is perpendicular to a rotation shaft of the turbine, and a turning angle of the vanes ranges from +45° to −45°, wherein, when the turbine is rotated in a single direction, the air currents are discharged into the nozzle and opening when the turning angle of the vanes is greater than 0° and the air currents are discharged into a suction channel grid when the turning angle of the vanes is less than 0°.

15. The sprayer accordingly to claim 1, wherein the sensor is a vehicle speed sensor and the sprayer configuration is determined based on a vehicle speed.

16. The sprayer accordingly to claim 1, wherein the sprayer configuration reduces energy consumption.

17. The sprayer accordingly to claim 1, wherein the stored data applicable to the spraying operation includes parameters selected from the group consisting of crop type, treatment type, pruning type, plant volume per unit area, treatment dose, weather conditions, vehicle speed and nozzle discharge.

* * * * *